(12) United States Patent
Bart (10) Patent No.: US 9,521,301 B2
(45) Date of Patent: Dec. 13, 2016

(54) FIXED VIEW MAGNETIC CAMERA

(71) Applicant: Alarm.com Incorporated, Vienna, VA (US)

(72) Inventor: Gary Bart, Weston, FL (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 14/931,366

(22) Filed: Nov. 3, 2015

(65) Prior Publication Data

US 2016/0127618 A1    May 5, 2016

Related U.S. Application Data

(60) Provisional application No. 62/074,554, filed on Nov. 3, 2014.

(51) Int. Cl.
| | |
|---|---|
| *G03B 3/00* | (2006.01) |
| *H04N 5/225* | (2006.01) |
| *F16M 11/04* | (2006.01) |
| *F16M 11/14* | (2006.01) |
| *F16M 13/00* | (2006.01) |
| *F16B 1/00* | (2006.01) |

(Continued)

(52) U.S. Cl.
CPC .......... *H04N 5/2252* (2013.01); *F16M 11/041* (2013.01); *F16M 11/14* (2013.01); *F16M 13/00* (2013.01); *H04N 5/2254* (2013.01); *F16B 2001/0035* (2013.01); *G02B 7/28* (2013.01); *G03B 3/00* (2013.01); *G03B 13/20* (2013.01)

(58) Field of Classification Search
CPC ...................................................... G03B 13/20

USPC ................... 396/142, 441, 535; 348/61, 187
See application file for complete search history.

(56) References Cited

U.S. PATENT DOCUMENTS 3,732,368 A * 5/1973 Mahlab ............ G08B 13/19632
                                                        348/151
4,920,367 A * 4/1990 Pagano ............ G08B 13/19619
                                                        348/143

(Continued)

FOREIGN PATENT DOCUMENTS

WO    WO2014106296 A1    7/2014

OTHER PUBLICATIONS alarm.com (http://www.alarm.com), Video Monitoring, Jun. 22, 2010.*

(Continued)

*Primary Examiner* — Clayton E LaBalle
*Assistant Examiner* — Kevin Butler
(74) *Attorney, Agent, or Firm* — Fish & Richardson P.C.

(57) ABSTRACT

At least one aspect of present disclosure is directed towards a camera that includes a magnetic base and a removable main camera unit. The removable main camera unit may include an outer casing, a processor, a lens housing, a wireless communications interface, and an inner casing. The inner casing may reside within the outer casing and includes at least a metallic portion and a non-metallic portion. The non-metallic portion may form a non-metallic region that may extend from at least a first boundary of the metallic portion to a second boundary of the metallic portion through a central axis of the inner casing. The removable main camera unit may be configured to be removably coupled to the magnetic base based on a magnetic force between the magnetic base and the metallic portion of the inner casing.

32 Claims, 5 Drawing Sheets

(51) Int. Cl.
*G02B 7/28* (2006.01)
*G03B 13/20* (2006.01)

(56) References Cited

U.S. PATENT DOCUMENTS

| | | | | |
|---|---|---|---|---|
| 5,045,871 | A | * | 9/1991 | Reinholdson .......... G03B 17/02 396/155 |
| 5,418,567 | A | * | 5/1995 | Boers ............... G08B 13/19619 348/143 |
| D395,715 | S | * | 6/1998 | Queen ......................... D16/203 |
| D399,517 | S | * | 10/1998 | Hasegawa ................... D16/203 |
| 5,818,519 | A | * | 10/1998 | Wren ............... G08B 13/19619 206/588 |
| 5,897,223 | A | * | 4/1999 | Tritchew .............. G03B 15/006 348/144 |
| D429,175 | S | * | 8/2000 | Ha ............................ D10/104.1 |
| D430,587 | S | * | 9/2000 | Summit ....................... D16/202 |
| D441,000 | S | * | 4/2001 | Vanderwilt .................. D16/202 |
| D458,292 | S | * | 6/2002 | Backs ......................... D16/242 |
| D467,952 | S | * | 12/2002 | Nakamura ................... D16/202 |
| D468,336 | S | * | 1/2003 | Kampf ........................ D16/242 |
| 6,503,000 | B1 | * | 1/2003 | Kim ......................... G03B 5/06 348/143 |
| D485,234 | S | * | 1/2004 | Katayama .................... D13/108 |
| D502,196 | S | * | 2/2005 | Miyazaki ..................... D16/202 |
| D516,105 | S | * | 2/2006 | Bradley ....................... D16/202 |
| 7,104,656 | B2 | * | 9/2006 | Dwyer ................. H04N 9/3141 348/E5.143 |
| D547,347 | S | * | 7/2007 | Kim ............................ D16/202 |
| D554,682 | S | * | 11/2007 | Martinez ..................... D16/203 |
| D557,321 | S | * | 12/2007 | Fisher ......................... D16/219 |
| D565,626 | S | * | 4/2008 | Leyden ....................... D16/203 |
| 7,491,002 | B2 | * | 2/2009 | Mulvey ................. G03B 17/08 396/427 |
| D628,223 | S | * | 11/2010 | Kao ............................ D16/202 |
| D633,931 | S | * | 3/2011 | Ham .......................... D16/203 |
| 7,955,006 | B1 | * | 6/2011 | Harvey ................. F16M 11/10 396/12 |
| D648,766 | S | * | 11/2011 | Chen ........................... D16/202 |
| D654,528 | S | * | 2/2012 | Easley ......................... D16/245 |
| 8,482,608 | B1 | | 7/2013 | Sandoval |
| D700,232 | S | * | 2/2014 | Ramsay ...................... D16/207 |
| D705,844 | S | * | 5/2014 | Bart ............................ D16/203 |
| D719,208 | S | * | 12/2014 | Mohan ....................... D16/203 |
| D723,604 | S | * | 3/2015 | Mohan ....................... D16/203 |
| D731,579 | S | * | 6/2015 | Bart ............................ D16/203 |
| D736,453 | S | * | 8/2015 | Motzkin ..................... D26/128 |
| 9,167,137 | B2 | * | 10/2015 | Neufeld .......... G08B 13/19619 |
| D742,955 | S | * | 11/2015 | Kozko ........................ D16/207 |
| D743,475 | S | * | 11/2015 | Cover ......................... D16/203 |
| D749,661 | S | * | 2/2016 | Yang ........................... D16/203 |
| 2008/0056708 | A1 | * | 3/2008 | Kim ....................... G03B 37/06 396/427 |
| 2008/0087779 | A1 | | 4/2008 | Liow |
| 2010/0081377 | A1 | | 4/2010 | Chatterjee |
| 2010/0128455 | A1 | * | 5/2010 | Ophoven ............ H04N 5/2252 361/818 |
| 2011/0066239 | A1 | * | 3/2011 | Smoot .................... A61F 2/141 623/6.64 |
| 2012/0263450 | A1 | * | 10/2012 | Totani .................... B60R 11/04 396/428 |
| 2012/0301130 | A1 | * | 11/2012 | Shi ............................ H01F 7/06 396/428 |
| 2013/0051778 | A1 | * | 2/2013 | Dimotakis ............ B64D 47/08 396/12 |
| 2013/0188943 | A1 | * | 7/2013 | Wu ........................ G03B 17/17 396/419 |
| 2013/0210563 | A1 | * | 8/2013 | Hollinger ............. H04N 5/2252 473/570 |
| 2013/0250047 | A1 | * | 9/2013 | Hollinger ............. H04N 5/2252 348/36 |
| 2014/0267596 | A1 | * | 9/2014 | Geerds ................ H04N 5/2252 348/38 |
| 2015/0373279 | A1 | * | 12/2015 | Osborne ............ G02B 13/0075 348/36 |

OTHER PUBLICATIONS

Artonne, Jean-Claude, WO/2014/106296 PCT/CA2013/050009 Abstract, Panoramic Camera, Jan. 7, 2013, 1 page.*
PCT/CA2013/050009 International Search Report, Jan. 7, 2013, 3 pages.*
PCT/CA2013/050009 PCT Written Opinion of the International Searching Authoritiy, Jan. 7, 2013, 4 pages.*
Bart, Gary, Fixed View Magnetic Camera, PCT/US15/58814, International Search Report and the Written Opinion of the ISA, Feb. 2, 2016, 17 pages.*
PCT Notification of Transmittal of the International Search Report and the Written Opinion for International Application No. PCT/US15/58814 dated Feb. 2, 2016, 9 pages.

* cited by examiner

FIXED VIEW MAGNETIC CAMERA

CROSS-REFERENCE TO RELATED APPLICATION

This application claims the benefit of U.S. Provisional Patent Application No. 62/074,554 filed on Nov. 3, 2014 and entitled "FIXED VIEW MAGNETIC CAMERA," which is incorporated herein by reference in its entirety.

BACKGROUND

There is a near limitless amount of applications that call for monitoring activity that occurs, or activity that has previously occurred, at one or more particular locations. In such circumstances, a system of one or more cameras may be employed to capture still images and/or moving images (e.g., video) from each respective location. A team of technicians may install a camera system in a manner that captures specific features of a particular location which fall within the camera's line of sight at the time of camera installment. However, the line of sight of such camera systems may be inherently limited by the structure used to mount the camera. Alternatively, or in addition, dynamically changing locations, preferences, and/or circumstances may require a dynamic reconfiguration of cameras to capture still images and/or moving images.

SUMMARY

According to one aspect of the subject matter described in this specification, a camera is disclosed that comprises a magnetic base and a removable main camera unit. The removable main camera unit may include an outer casing, a processor, a lens housing, a wireless communications interface, and an inner casing. The inner casing may reside within the outer casing and may also include at least a metallic portion and a non-metallic portion. The non-metallic portion may form a non-metallic region that may extend from at least a first boundary of the metallic portion to a second boundary of the metallic portion through a central axis of the inner casing. The removable main camera unit of the camera may be removably coupled to the magnetic base based on a magnetic force between the magnetic base and the metallic portion of the inner casing.

According to another aspect of the subject matter described by this specification, a device is disclosed that comprises a magnetic base and a removable main camera unit. The removable main camera unit of the device may include a processor, a lens housing, a wireless communication interface, and a casing that includes at least a metallic portion and a non-metallic portion. The non-metallic portion may form a non-metallic region that may extend from at least a first boundary of the metallic portion to a second boundary of the metallic portion through a central axis of the inner casing. The wireless communication interface may reside within the inner casing and may be configured to wirelessly transmit data away from the metallic portion of the inner casing and towards the non-metallic portion of the inner casing. The removable main camera unit of the device may be removably coupled to the magnetic base based on a magnetic force between the magnetic base and the metallic portion of the inner casing.

According to yet another aspect of the subject matter described by this specification, a spherical camera unit is disclosed that comprises a magnetic base and a removable main camera unit. The removable main camera unit of the spherical camera unit may include a processor, a lens housing, a heat sink that may be configured to transfer heat away from the processor, a wireless communications interface that may be configured to wirelessly send or receive data, and an inner casing that may include a metallic portion and a non-metallic portion. The inner casing may also include an air gap between the metallic portion and non-metallic portion that may aid in the transfer of heat away from the processor. The spherical camera unit may also include an outer casing that provides a physical barrier between at least the metallic portion of the inner casing and the magnetic base. The removable main camera unit may be configured to be removably coupled to the magnetic base based on a magnetic force that binds the inner casing of the removable main camera unit to the magnetic base through the outer casing.

Other implementations of the subject matter described by the present specification may be directed to a device that includes an outer casing that may be composed of at least plastic. Similarly, the non-metallic portion of the inner casing of the device may be composed of plastic. Alternatively, or in addition, the non-metallic portion of the inner casing may be an uncovered opening in the inner casing.

Yet other implementations of the subject matter described by the present specification may include wherein the first boundary and the second boundary of the metallic portion each terminate within the range of 45° to 75° from the central axis of the inner casing. In at least one aspect of the subject matter described in this specification, the first boundary and the second boundary of the metallic portion may each terminate at 60° from the central axis of the inner casing.

Alternatively, or in addition, other implementations of the subject matter described by the present specification may provide wherein the wireless communication interface may reside within the inner casing and may be configured to wirelessly transmit data away from the metallic portion of the inner casing and towards a non-metallic portion of the inner casing.

Alternatively, or in addition, other implementations of the subject matter described by the present specification provide wherein the device may include a heat sink that may be configured to transfer heat away from the processor to a thermally conductive metal strip that is located around the circumference of the removable main camera unit. Alternatively, or in addition, an air gap may exist between the metallic portion and the non-metallic portion of the inner casing that may be used to dissipate heat.

DETAILED DESCRIPTION

A device and technique are described for a fixed view magnetic camera. In some implementations, the fixed view magnetic camera (or the camera) can be used for monitoring and surveillance purposes. For example, the camera can be used as a surveillance camera at a home, a business, a vacation location, or any other property.

FIGS. 1A-1D are images of an example fixed view magnetic camera 100 from different orientations. The fixed view magnetic camera (or the camera) 100 includes a spherical main camera unit 110 and a magnetic base 130. The spherical main camera unit 110 includes a metal casing within the outer plastic casing (as shown in FIG. 2) and is attached to the base 130 magnetically, while maintaining a desired cosmetic appearance. The metal casing is attracted to the magnet in the base 130 sufficiently to maintain a substantially constant angle of the view of the camera 100 in a variety of mounting positions. The spherical main camera unit 110 also includes a lens housing 115 (see FIG. 1A) that can house one or multiple components enabling the fixed view magnetic camera 100 to perform monitoring activities. For example, the lens housing 115 can feature one or more camera devices 160, such as, for example, one or more video cameras, still cameras, infrared cameras, night vision cameras, or other devices capable of capturing static images and/or video from the environment surrounding the fixed view magnetic camera 100. In some instances, the lens housing 115 can feature other electronics and circuitry required to operate the one or more camera devices. Furthermore, in some implementations, the lens housing 115 can also feature one or more other sensors, such as one or more microphones, motion sensors, contact sensors, light sensors, environmental or monitoring sensors, and/or the like. Given the magnetic connection between the main camera unit 110 and the base 130 and the spherical shape of the main camera unit 110, a view of the fixed view magnetic camera 100 may be easily set by orienting the main camera unit 110 with the desired field of view and placing on the base 130 to secure through the magnetic force between the main camera unit 110 and the base 130. To change the field of view, a user may lift the main camera unit 110 off the base 130 by overcoming the magnetic connection, reorient, and then place the main camera unit 110 back on the base 130 to reattach through the magnetic force between the main camera unit 110 and the base 130.

Figure 1A:
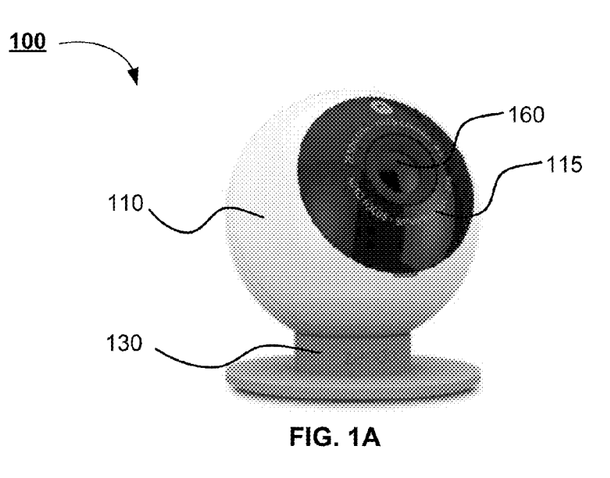
FIGS. 1A, 1B, 1C and 1D are images of an example fixed view magnetic camera from different orientations.
Figure 1B:
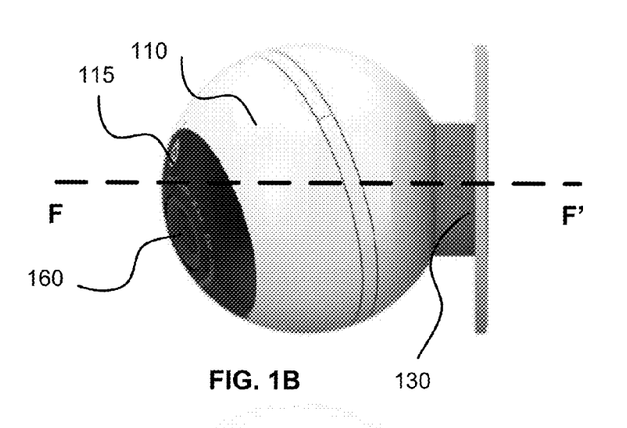
Figure 1C:
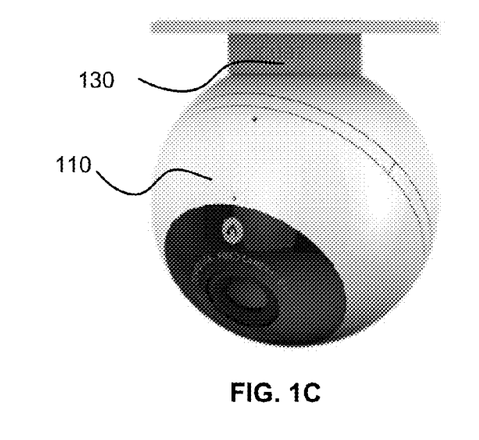
Figure 1D:
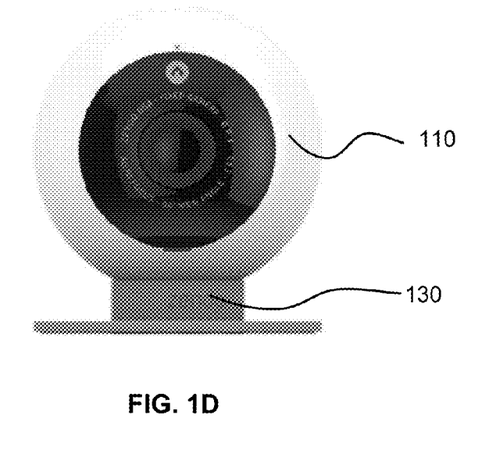
Figure 2A:
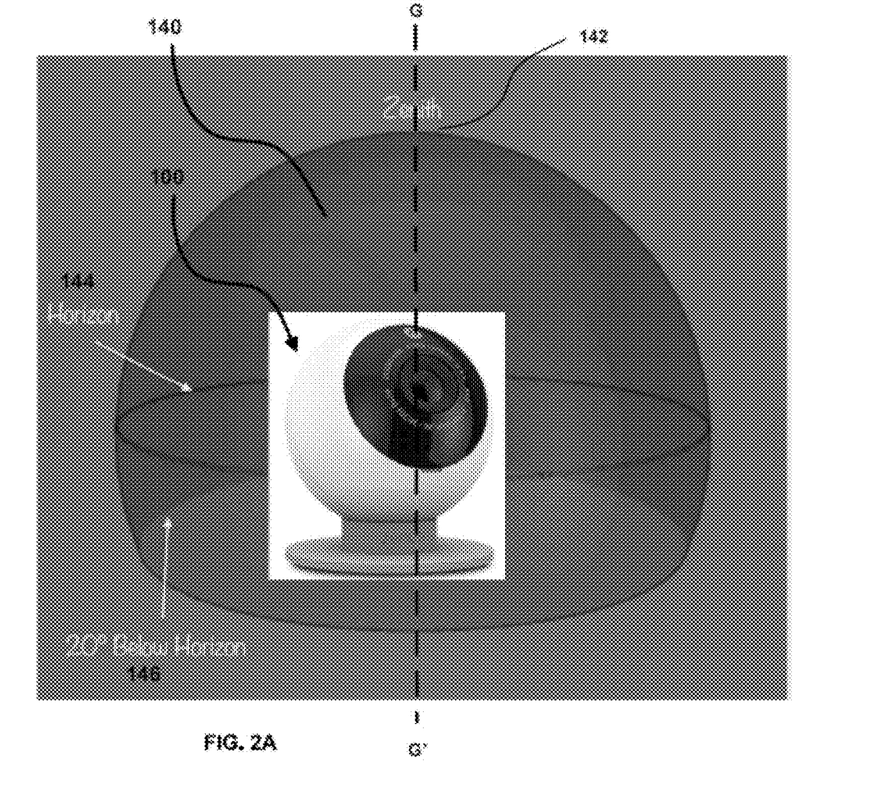
FIG. 2A illustrates example fields of view of the example fixed view magnetic camera.

FIG. 2A illustrates example fields of view of the fixed view magnetic camera. While these illustrations generally describe the capabilities of the fixed view magnetic camera 100 to monitor various fields of view, the specific fields of view available to the fixed view magnetic camera 100 according to this description may be dependent upon certain design characteristics of the fixed view magnetic camera 100. For instance, by changing the angle at which spherical main camera unit 110 is mounted on the magnetic base 130 or by changing the shape of the base 130, the range of available positions for the lens housing 115 of the camera housing can be adjusted. As an example, FIG. 2 provides an illustration that describes the example fields of view of the fixed view magnetic camera 100. The range of possible fields of view of the fixed view magnetic camera 100 may be described by a modified hemisphere 140, such that the possible fields of view of the fixed view magnetic camera 100 range from the zenith 142 of the modified hemisphere (e.g., along the vertical axis represented by the line GG' passing through the fixed view magnetic camera 100) to a point 146 below the horizon 144 of the modified hemisphere (e.g., a point below the horizontal axis that is perpendicular to the vertical axis). The fixed view magnetic camera 100 is capable of performing imaging at any point along this range from the zenith 140 to the point near or below the horizon 144 and in any direction around the vertical axis GG.' That is, depending on the orientation of the main camera unit 110 on the base 130, the fixed view magnetic camera 100 may be capable of performing imaging throughout the modified hemisphere.

The fixed view magnetic camera 100 can use one or multiple wireless technologies to communicate with user devices, such as, for example, servers, desktop computers, laptop computers, tablets, smart phones, cellular phones, web-enabled appliances, vehicles with internet capabilities, and/or the like. The fixed view magnetic camera 100 can include wireless port(s) in a communication interface to send and/or receive data units (e.g., data packets) via a variety of wireless communication protocols such as, for example, a Wi-Fi® protocol, a Worldwide Interoperability for Microwave Access (WiMAX) protocol, a cellular protocol (e.g., a third generation mobile telecommunications (3G), a fourth generation mobile telecommunications (4G) protocol, or a 4G long term evolution (4G LTE) protocol), and/or the like.

Figure 2B:
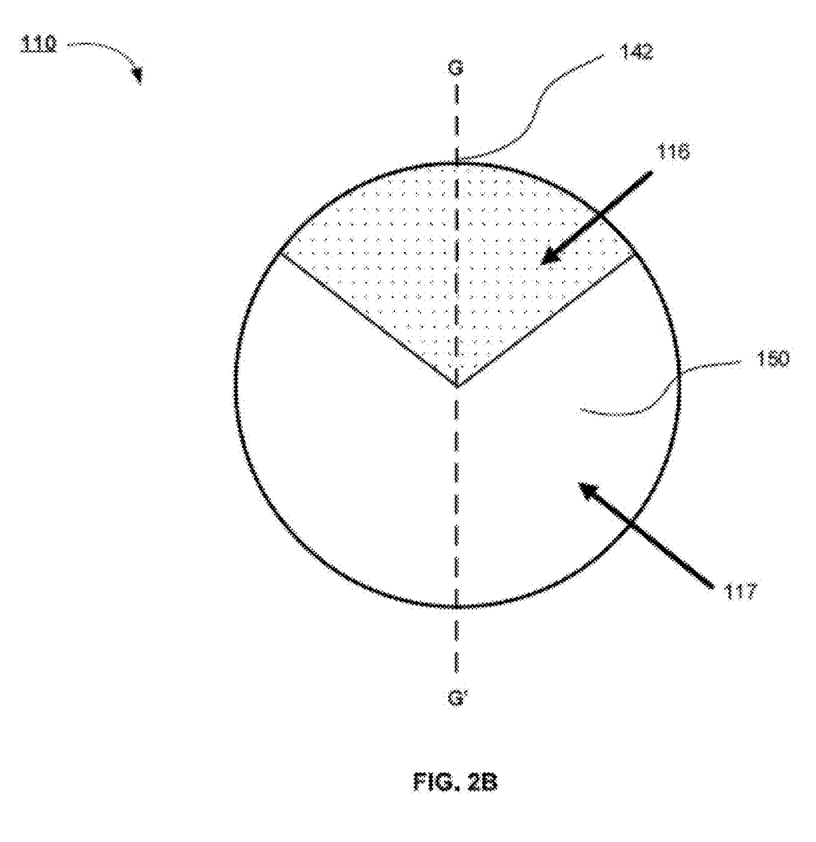
FIG. 2B is a cross-sectional image of an example spherical main camera unit.

FIG. 2B is a cross-sectional image of the spherical main camera unit 110. The wireless communication capabilities of the fixed view magnetic camera 100 described above can be impeded by the metal casing of the spherical main camera unit 110 that essentially forms a Faraday cage, and thereby severely impedes (or blocks) the wireless transmission of (radio frequency) signals. To overcome these limitations, and to maintain the mounting objectives of the fixed view magnetic camera 100, the fixed view magnetic camera 100 includes an accommodation that is suited to both the metal enclosure and to the design of an antennae for wireless communications. In the implementation of the fixed view magnetic camera 100 shown in FIGS. 1A-1D and FIG. 2B, a location for wireless antenna (or transceiver) coverage may be on top of the unit. In such implementation, a metal shell 150 of the spherical main camera unit 110 does not cover the entire internal surface of the spherical main camera unit 110. Instead, the metal shell 150 stops approximately 60° from the zenith of the spherical main camera unit 110 on each side, thus providing a 120° opening in the metal shell 150, which defines a non-metallic zone 116 (metal free area) and a metallic zone 117 in FIG. 2B. This allows for the wireless antennae to be placed in the top of the spherical main camera unit 110 in such a way that the transmission pattern of the wireless antennae are directed away from the metal shell 150. The features of the fixed view magnetic camera 100 described above that includes a combination of a spherical main camera unit 110 that is mounted on the magnetic base 130 may provide significant advantages, namely: (i) a substantially unlimited number of viewing angles and mounting positions, and (ii) is coupled with the wireless antennae design and absence of the metal shell approximately 60° from the zenith of the metal casing in the spherical main camera unit 110 in such a way as to neither interfere with mounting nor wireless antennae performance.

Additionally, a feature of the fixed view magnetic camera 100 is a small size that does not include any visible ventilation openings in the spherical main camera unit 110. Cameras may have very high thermal characteristics due to the video codec processor, multipoint control unit (MCU), night vision infra-red light emitting diodes (IR LEDs), one or more motors in the body of the camera, one or more sensors and their supporting electronics, and/or other electrical components, etc. This can generate a significant amount of heat and has to be dissipated to avoid the fixed view magnetic camera 100 from overheating and becoming non-functional (e.g., by the camera entering a safety mode to avoid overheating, or by one or more components of the camera failing due to the overheating).

Figure 3:
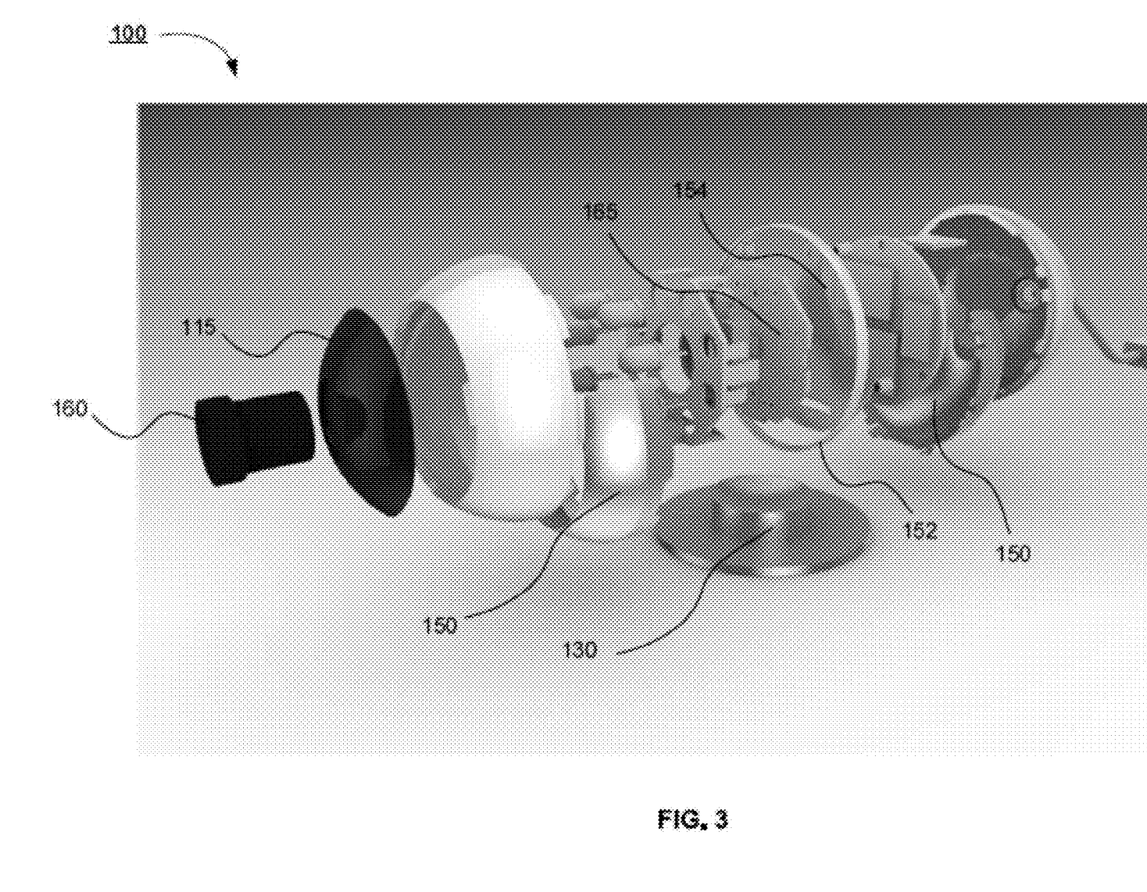
FIG. 3 is an exploded view of the example fixed view magnetic camera.

FIG. 3 is an exploded view of the fixed view magnetic camera 100. The exploded view shows the different components of the fixed view magnetic camera 100, such as the magnetic base 130 and the spherical main camera unit 110. In order to maintain the small size and resulting close proximity of the different components within the spherical main camera unit 110, heat may be adequately removed from the spherical main camera unit 110 without any ventilation holes. Hence, the fixed view magnetic camera 100 may include a thermally conductive metal strip that plays a significant role in heat dissipation from the different components of the spherical main camera unit 110, and primarily from the codec processor. The codec processor encodes a data stream or signal for transmission, storage or encryption, or decodes it for playback or editing. Codecs can be used in videoconferencing, streaming media and video editing applications. The fixed view magnetic camera 100 can also include an analog-to-digital converter (ADC) that can convert analog signals into digital signals, which are then passed through a video compressor for digital transmission or storage. Such processing of signals is computationally very intensive and leads to significant heat generation by the codec processor and/or ADC. Hence, the fixed view magnetic camera 100 includes a heat sink (e.g., heat sink 154 as shown in FIG. 3) that can be comprised of, for example, a thermally conductive metal strip 152 that is in contact with the different components housed within lens housing 115 where a main circuit board of the camera may be located (e.g., circuit board 165 shown in FIG. 3). Such a circuit board may feature components associated with one or more camera devices 160 (such as, for example, the codec processor), image sensors, or other sensors, and may therefore generate considerable heat under operation. The metal band 152 may enable dissipation of this heat. For example, the metal band 152 may dissipate heat by being directly connected to the high heat generating components on the main circuit board, thereby serving as a heat sink.

The spherical main camera unit 110 includes the metal shells 150, the lens housing 115, the camera device and accompanying circuitry 160, and the metal band or ring 152 that is in contact with the heat sink 154 (the heat sink 154 is in contact with the codec processor (or the codec chip)). Referring to FIG. 2B and FIG. 3, the fixed view magnetic camera 100 includes a heat sink 154 that is composed of a thermally conductive metal strip and plays a significant role in heat dissipation from the different components of the spherical main camera unit 110, and primarily from the codec processor. The thermally conductive metal strip of the heat sink 154 is connected to an external metal band (e.g. metal band 152 as shown in FIG. 3) that is located around the circumference of the spherical main camera unit 110. The metal shells 150, however, does not go completely around the circumference of the spherical main camera unit due to the wireless signal interference problems described above. Instead, the metal shells 150 stop approximately 60° from the zenith 142 on either side of the spherical main camera unit 110, thus providing a 120° non-metallic zone 116 (metal free area) so as not to interfere with the wireless antenna performance. The portion of the spherical main camera unit 110 in the non-metallic zone 116 (metal free area) can include a band made of plastic and is placed and designed to maintain a consistent appearance to the metallic zone 117 of the spherical main camera unit 110. Such a design can also incorporate a substantially invisible air gap around the metal/plastic band to provide for convective cooling.

Figure 4A:
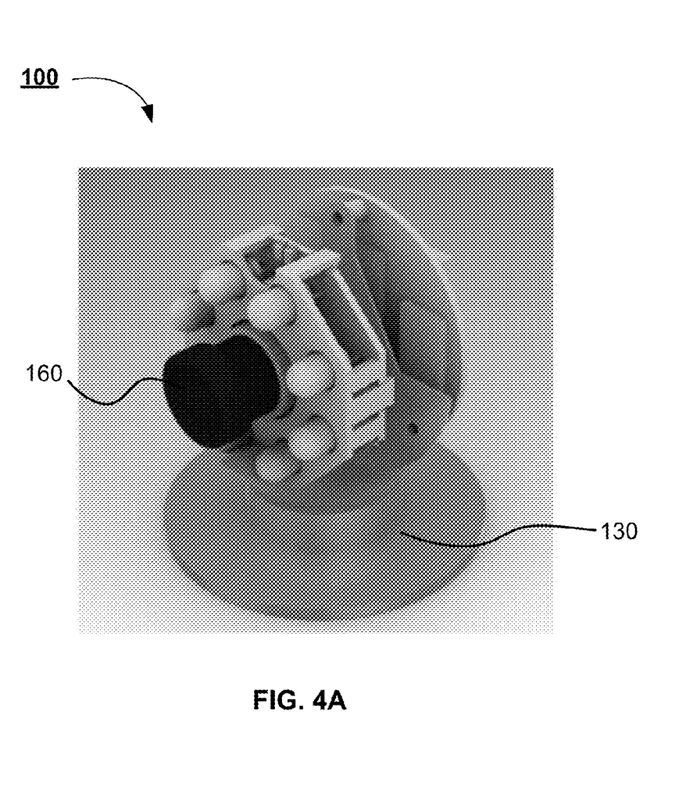
FIGS. 4A and 4B are images that show the example fixed view magnetic camera assembled without any outer cosmetic plastics.
Figure 4B:
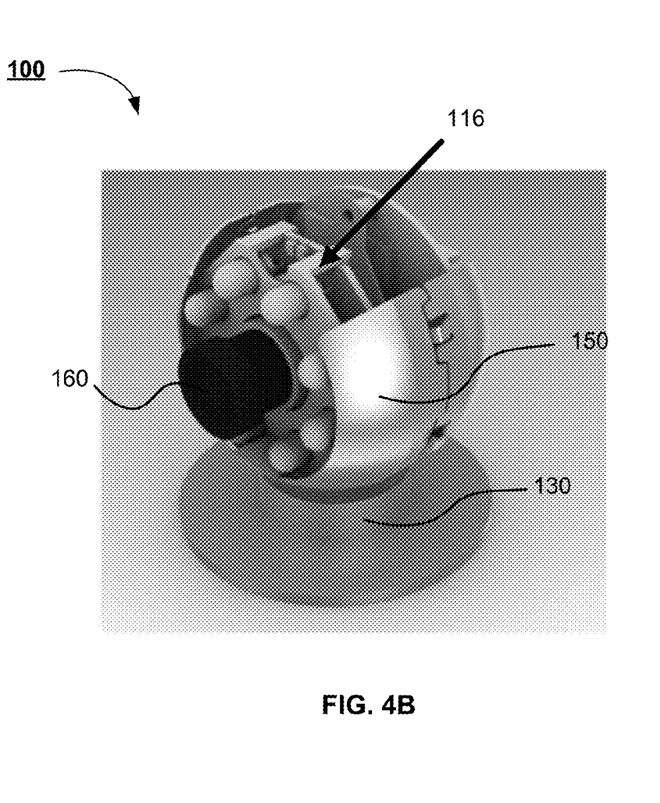

FIGS. 4A-4B are images that show the fixed view magnetic camera 100 assembled without outer cosmetic plastics. In FIG. 4A, the fixed view magnetic camera 100 is shown without the metal shells (e.g., metal shells 150 as shown in FIG. 3). In FIG. 4B, the fixed view magnetic camera 100 is shown with the metal shells (e.g., metal shells 150 as shown in FIG. 3). The opening in the metal shells 150 that creates the non-metallic zone 116 (metal free area) allows for the placement and orientation of a wireless antennae to allow for wireless communication of the fixed view magnetic camera 100 with external user devices. The non-metallic region 116 shown in FIG. 4B corresponds to the cross-sectional diagram of the non-metallic zone 116 (metal free area) shown and discussed in relation to FIG. 2B.

The fixed view magnetic camera 100 may be configured for mounting to any number of surfaces, such as a wall, ceiling, roof, window sill, or other surface. Generally, the fixed view magnetic camera 100 may be mounted such that the magnetic base 130 is fixed to the surface, with the spherical main camera unit 110 generally being capable of mounting in any orientation. Mounting orientations of the spherical main camera unit 110 may be such that the magnetic base 130 is mounted to a surface parallel to the horizontal, for example, a ceiling or floor. The camera may also be mounted to other surfaces that are vertical, such as a wall, or at an angle, such as on a slanted roof. In some instances, mounting of the fixed view magnetic camera 100 can utilize a mounting bracket. Mounting of the fixed view magnetic camera 100 can utilize a method similar to a drywall anchor, a wood screw, a concrete anchor, or other types of anchors. In some implementations, mounting of the fixed view magnetic camera 100 can utilize a unique type of mounting screw to enable the installation and subsequent removal of the camera.

The described device and techniques may be implemented in any material and using any process capable of forming the described structures and of performing the described actions. The described systems, methods, and techniques may be implemented in digital electronic circuitry, computer hardware, firmware, software, or in combinations of these elements. Apparatus implementing these techniques can include appropriate input and output devices, a computer processor, and a computer program product tangibly embodied in a machine-readable storage device for execution by a programmable processor. A process implementing these techniques can be performed by a programmable processor executing a program of instructions to perform desired functions by operating on input data and generating appropriate output. The techniques can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of nonvolatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing can be supplemented by, or incorporated in, specially designed application specific integrated circuits (ASICs).

It will be understood that various modifications can be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The invention claimed is:

1. A camera, comprising:
   a magnetic base; and
   a removable main camera unit that includes:
      an outer casing;
      a processor;
      a lens housing;
      a wireless communications interface; and
      an inner casing that resides within the outer casing and includes at least a metallic portion and a non-metallic portion, wherein the non-metallic portion forms a non-metallic region that extends from at least a first boundary of the metallic portion to a second boundary of the metallic portion through a central axis of the inner casing, wherein the non-metallic portion of the inner casing includes plastic,
   wherein the removable main camera unit is configured to be removably coupled to the magnetic base based on a magnetic force between the magnetic base and the metallic portion of the inner casing.

2. The camera of claim 1, wherein the outer casing includes plastic.

3. The camera of claim 1, wherein the wireless communication interface resides within the inner casing and is configured to wirelessly transmit data away from the metallic portion of the inner casing and towards the non-metallic portion of the inner casing.

4. The camera of claim 1, wherein the first boundary and the second boundary of the metallic portion each terminate within the range of 45° to 75° from the central axis of the inner casing.

5. The camera of claim 4, wherein the first boundary and the second boundary of the metallic portion each terminate at 60° from the central axis of the inner casing.

6. The camera of claim 1, further comprising:
   a heat sink that is configured to transfer heat away from the processor to a thermally conductive metal strip that is located around the circumference of the removable main camera unit; and
   an air gap that exists between the metallic portion of the inner casing and the non-metallic portion of the inner casing to dissipate heat.

7. A camera, comprising:
   a magnetic base; and
   a removable main camera unit that includes:
      an outer casing;
      a processor;
      a lens housing;
      a wireless communications interface; and
      an inner casing that resides within the outer casing and includes at least a metallic portion and a non-metallic portion, wherein the non-metallic portion forms a non-metallic region that extends from at least a first boundary of the metallic portion to a second boundary of the metallic portion through a central axis of the inner casing, wherein the non-metallic portion of the inner casing includes an uncovered opening in the inner casing,
   wherein the removable main camera unit is configured to be removably coupled to the magnetic base based on a magnetic force between the magnetic base and the metallic portion of the inner casing.

8. The camera of claim 7, wherein the first boundary and the second boundary of the metallic portion each terminate within the range of 45° to 75° from the central axis of the inner casing.

9. The camera of claim 8, wherein the first boundary and the second boundary of the metallic portion each terminate at 60° from the central axis of the inner casing.

10. The camera of claim 7, wherein the wireless communication interface resides within the inner casing and is configured to wirelessly transmit data away from the metallic portion of the inner casing and towards the non-metallic portion of the inner casing.

11. The camera of claim 7, further comprising:
    a heat sink that is configured to transfer heat away from the processor to a thermally conductive metal strip that is located around the circumference of the removable main camera unit; and
    an air gap that exists between the metallic portion of the inner casing and the non-metallic portion of the inner casing to dissipate heat.

12. The camera of claim 7, wherein the outer casing includes plastic.

13. A camera, comprising:
    a magnetic base; and
    a removable main camera unit that includes:
       an outer casing;
       a processor;
       a lens housing;
       a wireless communications interface; and
       an inner casing that resides within the outer casing and includes at least a metallic portion and a non-metallic portion, wherein the non-metallic portion forms a non-metallic region that extends from at least a first boundary of the metallic portion to a second boundary of the metallic portion through a central axis of the inner casing, wherein the first boundary and the second boundary of the metallic portion each terminate within the range of 45° to 75° from the central axis of the inner casing,
    wherein the removable main camera unit is configured to be removably coupled to the magnetic base based on a magnetic force between the magnetic base and the metallic portion of the inner casing.

14. The camera of claim 13, wherein the first boundary and the second boundary of the metallic portion each terminate at 60° from the central axis of the inner casing.

15. A camera, comprising:
    a magnetic base; and
    a removable main camera unit that includes:
       an outer casing;
       a processor;
       a lens housing;
       a heat sink that is configured to transfer heat away from the processor to a thermally conductive metal strip that is located around the circumference of the removable main camera unit;
a wireless communications interface;
an inner casing that resides within the outer casing and includes at least a metallic portion and a non-metallic portion, wherein the non-metallic portion forms a non-metallic region that extends from at least a first boundary of the metallic portion to a second boundary of the metallic portion through a central axis of the inner casing; and
an air gap that exists between the metallic portion of the inner casing and the non-metallic portion of the inner casing to dissipate heat,
wherein the removable main camera unit is configured to be removably coupled to the magnetic base based on a magnetic force between the magnetic base and the metallic portion of the inner casing.

16. A device, comprising:
a magnetic base; and
a removable main camera unit that includes:
  a processor;
  a lens housing;
  a casing that includes at least a metallic portion and a non-metallic portion, wherein the non-metallic portion forms a non-metallic region that extends from at least a first boundary of the metallic portion to a second boundary of the metallic portion through a central axis of the inner casing, wherein the first boundary and the second boundary of the metallic portion each terminate within the range of 45° to 75° from the central axis of the casing;
  a wireless communication interface, wherein the wireless communication interface resides within the casing and is configured to wirelessly transmit data away from the metallic portion of the casing and towards the non-metallic portion of the casing,
wherein the removable main camera unit is configured to be removably coupled to the magnetic base based on a magnetic force between the magnetic base and the metallic portion of the casing.

17. The device of claim 16, wherein the first boundary and the second boundary of the metallic portion each terminate at 60° from the central axis of the casing.

18. A device, comprising:
a magnetic base; and
a removable main camera unit that includes:
  a processor;
  a lens housing;
  a casing that includes at least a metallic portion and a non-metallic portion, wherein the non-metallic portion forms a non-metallic region that extends from at least a first boundary of the metallic portion to a second boundary of the metallic portion through a central axis of the casing, wherein the non-metallic portion of the casing includes plastic;
  a wireless communication interface, wherein the wireless communication interface resides within the casing and is configured to wirelessly transmit data away from the metallic portion of the casing and towards the non-metallic portion of the casing,
wherein the removable main camera unit is configured to be removably coupled to the magnetic base based on a magnetic force between the magnetic base and the metallic portion of the casing.

19. The device of claim 18, wherein the first boundary and the second boundary of the metallic portion each terminate within the range of 45° to 75° from the central axis of the casing.

20. The device of claim 18, further comprising:
a heat sink that is configured to transfer heat away from the processor to a thermally conductive metal strip that is located around the circumference of the removable main camera unit; and
an air gap that exists between the metallic portion of the casing and the non-metallic portion of the casing to dissipate heat.

21. A device, comprising:
a magnetic base; and
a removable main camera unit that includes:
  a processor;
  a lens housing;
  a casing that includes at least a metallic portion and a non-metallic portion, wherein the non-metallic portion forms a non-metallic region that extends from at least a first boundary of the metallic portion to a second boundary of the metallic portion through a central axis of the casing;
  a heat sink that is configured to transfer heat away from the processor to a thermally conductive metal strip that is located around the circumference of the removable main camera unit;
  an air gap that exists between the metallic portion of the casing and the non-metallic portion of the casing to dissipate heat; and
  a wireless communication interface, wherein the wireless communication interface resides within the casing and is configured to wirelessly transmit data away from the metallic portion of the casing and towards the non-metallic portion of the casing,
wherein the removable main camera unit is configured to be removably coupled to the magnetic base based on a magnetic force between the magnetic base and the metallic portion of the casing.

22. A spherical camera unit, comprising:
a magnetic base; and
a removable main camera unit that includes:
  a processor;
  a lens housing;
  a heat sink that is configured to transfer heat away from the processor;
  a wireless communications interface configured to wirelessly send or receive data;
  an inner casing that includes a metallic portion and a non-metallic portion, wherein an air gap exists between the metallic portion and non-metallic portion that aids in the transfer of heat away from the processor; and
  an outer casing that provides a physical barrier between at least the metallic portion of the inner casing and the magnetic base,
wherein the removable main camera unit is configured to be removably coupled to the magnetic base based on a magnetic force that binds the inner casing of the removable main camera unit to the magnetic base through the outer casing.

23. The spherical camera unit of claim 22, wherein the non-metallic portion forms a non-metallic region that extends from at least a first boundary of the metallic portion to a second boundary of the metallic portion through a central axis of the inner casing.

24. The spherical camera unit of claim 23, wherein the first boundary and the second boundary of the metallic portion each terminate within the range of 45° to 75° from the central axis of the inner casing.

25. The spherical camera unit of claim 24, wherein the first boundary and the second boundary of the metallic portion each terminate at 60° from the central axis of the inner casing.

26. The spherical camera unit of claim 22, wherein the wireless communication interface resides within the inner casing and is configured to wirelessly transmit data away from the metallic portion of the inner casing and towards the non-metallic portion of the inner casing.

27. The spherical camera unit of claim 22, wherein the non-metallic portion of the inner casing includes plastic.

28. The spherical camera unit of claim 22, wherein the non-metallic portion of the inner casing includes an uncovered opening of the inner casing.

29. A device, comprising:
a magnetic base; and
a removable main camera unit that includes:
 a processor;
 a lens housing;
 a casing that includes at least a metallic portion and a non-metallic portion, wherein the non-metallic portion forms a non-metallic region that extends from at least a first boundary of the metallic portion to a second boundary of the metallic portion through a central axis of the casing, wherein the non-metallic portion of the casing includes an uncovered opening in the casing;
 a wireless communication interface, wherein the wireless communication interface resides within the casing and is configured to wirelessly transmit data away from the metallic portion of the casing and towards the non-metallic portion of the casing,
wherein the removable main camera unit is configured to be removably coupled to the magnetic base based on a magnetic force between the magnetic base and the metallic portion of the casing.

30. The device of claim 29, wherein the first boundary and the second boundary of the metallic portion each terminate within the range of 45° to 75° from the central axis of the casing.

31. The device of claim 30, wherein the first boundary and the second boundary of the metallic portion each terminate at 60° from the central axis of the casing.

32. The device of claim 29, further comprising:
a heat sink that is configured to transfer heat away from the processor to a thermally conductive metal strip that is located around the circumference of the removable main camera unit; and
an air gap that exists between the metallic portion of the casing and the non-metallic portion of the casing to dissipate heat.

* * * * *